(12) United States Patent
Rayl et al.

(10) Patent No.: US 8,776,762 B2
(45) Date of Patent: Jul. 15, 2014

(54) HCCI MODE SWITCHING CONTROL SYSTEM AND METHOD

(75) Inventors: Allen B. Rayl, Waterford, MI (US); Vijay Ramappan, Novi, MI (US); Peter Kafarnik, Eltville-Erbach (DE); Jun-Mo Kang, Ann Arbor, MI (US); Hanho Yun, Oakland Township, MI (US)

(73) Assignee: GM Global Technology Operations LLC

( * ) Notice: Subject to any disclaimer, the term of this patent is extended or adjusted under 35 U.S.C. 154(b) by 1112 days.

(21) Appl. No.: 12/634,082

(22) Filed: Dec. 9, 2009

(65) Prior Publication Data

US 2011/0132318 A1 Jun. 9, 2011

(51) Int. Cl.
*F02B 5/00* (2006.01)
*F02B 17/00* (2006.01)

(52) U.S. Cl.
USPC .......................... 123/305; 123/295; 701/103

(58) Field of Classification Search
USPC ................. 123/295, 305, 430; 701/103, 104
See application file for complete search history.

(56) References Cited

U.S. PATENT DOCUMENTS

| | | | |
|---|---|---|---|
| 5,036,668 A | 8/1991 | Hardy | |
| 5,051,909 A | 9/1991 | Gomez et al. | |
| 5,253,619 A | 10/1993 | Richeson et al. | |
| 6,178,943 B1 | 1/2001 | Taga et al. | |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,308,682 B1 | 10/2001 | Ma | |
| 6,336,436 B1 | 1/2002 | Miyakubo et al. | |
| 6,343,581 B2 | 2/2002 | Suzuki | |
| 6,390,054 B1 | 5/2002 | Yang | |
| 6,450,136 B1 | 9/2002 | Klomp | |
| 6,463,889 B2 | 10/2002 | Reddy | |
| 6,497,213 B2 | 12/2002 | Yoshizawa et al. | |
| 6,516,774 B2 | 2/2003 | zur Loye et al. | |
| 6,570,265 B1 | 5/2003 | Shiraishi et al. | |
| 6,615,771 B2 | 9/2003 | Dengeretal. | |
| 6,619,254 B2 | 9/2003 | Chmela et al. | |
| 6,619,255 B2 | 9/2003 | Urushihara et al. | |
| 6,622,710 B2 | 9/2003 | Hasegawa et al. | |
| 6,637,393 B2 | 10/2003 | Sutherland | |
| 6,637,404 B2 | 10/2003 | Fuerhapter et al. | |
| 6,662,785 B1 | 12/2003 | Sloane et al. | |
| 6,668,790 B2 | 12/2003 | Chmela et al. | |
| 6,675,579 B1 | 1/2004 | Yang | |
| 6,725,825 B1 | 4/2004 | Kurtz et al. | |
| 6,739,295 B1 | 5/2004 | Yamaoka et al. | |

(Continued)

FOREIGN PATENT DOCUMENTS

| CN | 101495729 A | 7/2009 |
|---|---|---|
| JP | 2000-320333 | 11/2000 |

(Continued)

*Primary Examiner* — Erick Solis
*Assistant Examiner* — Anthony L Bacon (57) ABSTRACT

A control system and method for operating an engine includes a threshold determination module that determines a plurality of combustion mode thresholds based on the engine speed and engine temperature. The control module also includes a transition module that compares the engine load and the plurality of combustion mode thresholds and changes a combustion mode of the engine in response to comparing the engine load and the plurality of combustion mode thresholds.

20 Claims, 5 Drawing Sheets

(56) References Cited

U.S. PATENT DOCUMENTS

| | | |
|---|---|---|
| 6,769,403 B2 | 8/2004 | Rayl et al. |
| 6,772,585 B2 * | 8/2004 | Iihoshi et al. ............... 60/277 |
| 6,923,167 B2 | 8/2005 | Flowers |
| 6,948,482 B2 | 9/2005 | Kilkenny et al. |
| 6,951,201 B2 | 10/2005 | Zhu et al. |
| 6,957,640 B1 | 10/2005 | Liu et al. |
| 6,964,256 B2 | 11/2005 | Kataoka et al. |
| 6,971,343 B2 | 12/2005 | Hitomi et al. |
| 6,971,365 B1 | 12/2005 | Najt et al. |
| 6,994,072 B2 | 2/2006 | Kuo et al. |
| 7,021,276 B2 | 4/2006 | Liu et al. |
| 7,036,482 B2 | 5/2006 | Beck et al. |
| 7,059,281 B2 | 6/2006 | Kuo et al. |
| 7,080,613 B2 | 7/2006 | Kuo |
| 7,082,898 B2 | 8/2006 | Kitamura et al. |
| 7,089,908 B2 | 8/2006 | Fujieda et al. |
| 7,104,349 B2 | 9/2006 | Gray, Jr. |
| 7,121,233 B2 | 10/2006 | Kitamura et al. |
| 7,121,254 B2 | 10/2006 | Wickman et al. |
| 7,121,255 B2 | 10/2006 | Liu et al. |
| 7,128,062 B2 | 10/2006 | Kuo et al. |
| 7,134,409 B2 | 11/2006 | Mitani et al. |
| 7,168,420 B1 | 1/2007 | Yang |
| 7,194,996 B2 | 3/2007 | Koopmans |
| 7,210,457 B2 | 5/2007 | Kuzuyama |
| 7,213,572 B2 | 5/2007 | Yang |
| 7,234,438 B2 | 6/2007 | Yang |
| 7,240,659 B2 | 7/2007 | Yang |
| 7,263,968 B2 | 9/2007 | Cairns et al. |
| 7,274,986 B1 | 9/2007 | Petridis et al. |
| 7,357,103 B2 * | 4/2008 | Koopmans ............... 123/27 R |
| 7,367,310 B2 | 5/2008 | Kakuya et al. |
| 7,370,616 B2 | 5/2008 | Kuo et al. |
| 7,461,628 B2 | 12/2008 | Blumberg et al. |
| 7,469,672 B2 | 12/2008 | Andri |
| 7,478,620 B2 | 1/2009 | Kuo et al. |
| 7,529,637 B2 | 5/2009 | Snyder |
| 7,610,897 B2 | 11/2009 | Rayl |
| 7,729,844 B2 | 6/2010 | Rayl et al. |
| 7,827,944 B2 | 11/2010 | Pierik |
| 7,845,319 B2 | 12/2010 | Rayl |
| 7,866,286 B2 | 1/2011 | Sun |
| 7,974,766 B2 | 7/2011 | Rayl |
| 7,975,668 B2 | 7/2011 | Ramappan et al. |
| 7,979,195 B2 | 7/2011 | Rayl |
| 2002/0121263 A1 | 9/2002 | Chmela et al. |
| 2003/0230276 A1 | 12/2003 | Kataoka et al. |
| 2004/0084010 A1 | 5/2004 | Kurtz et al. |
| 2004/0129245 A1 | 7/2004 | Hitomi et al. |
| 2004/0182359 A1 | 9/2004 | Stewart et al. |
| 2005/0081511 A1 * | 4/2005 | Tomita et al. ............... 60/274 |
| 2005/0211218 A1 | 9/2005 | Liu et al. |
| 2005/0288846 A1 | 12/2005 | Liu et al. |
| 2006/0174853 A1 * | 8/2006 | Koopmans ............... 123/295 |
| 2006/0196466 A1 | 9/2006 | Kuo et al. |
| 2006/0196467 A1 | 9/2006 | Kang et al. |
| 2006/0196468 A1 | 9/2006 | Chang et al. |
| 2006/0196469 A1 | 9/2006 | Kuo et al. |
| 2006/0219214 A1 | 10/2006 | Okude et al. |
| 2006/0236958 A1 | 10/2006 | Sun et al. |
| 2006/0243241 A1 | 11/2006 | Kuo et al. |
| 2007/0062483 A1 | 3/2007 | Yang |
| 2007/0062484 A1 * | 3/2007 | Yang ............... 123/295 |
| 2007/0062486 A1 | 3/2007 | Yang |
| 2007/0204830 A1 * | 9/2007 | Andri ............... 123/198 F |
| 2007/0204838 A1 * | 9/2007 | Leone et al. ............... 123/518 |
| 2007/0215095 A1 | 9/2007 | Kakuya et al. |
| 2008/0066459 A1 | 3/2008 | O'Neill |
| 2008/0066713 A1 | 3/2008 | Megli et al. |
| 2008/0257306 A1 | 10/2008 | Chen et al. |
| 2009/0048760 A1 * | 2/2009 | Chen et al. ............... 701/103 |
| 2009/0229563 A1 | 9/2009 | Rayl et al. |

FOREIGN PATENT DOCUMENTS

| | | |
|---|---|---|
| JP | 2001-03800 | 1/2001 |
| JP | 2006-046303 | 2/2006 |
| JP | 2007-040235 | 2/2007 |
| JP | 2007-064210 | 3/2007 |
| WO | WO 2007/017109 | 2/2007 |

\* cited by examiner

HCCI MODE SWITCHING CONTROL SYSTEM AND METHOD

FIELD

The present disclosure relates to engine control systems, and more particularly to engine control systems for engines operating in both spark ignition (SI) and homogenous charge compression ignition (HCCI) modes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines may be operated in a spark ignition (SI) mode and a homogeneous charge compression ignition (HCCI) mode. The HCCI mode involves compressing a mixture of fuel and an oxidizer to a point of auto-ignition. One of the modes may be selected based on engine speed and load. In the HCCI mode, ignition occurs at several locations at a time, which makes a fuel/air mixture burn nearly simultaneously. The HCCI mode performs close to an ideal Otto cycle, provides improved operating efficiency, and generates lower emission levels as compared to SI mode. However, since there is no direct initiator of combustion, the ignition process tends to be more difficult to control.

The HCCI mode may have various sub-modes, depending on the engine speed and load.

SUMMARY

In one aspect of the disclosure, a method includes determining engine speed, determining an engine temperature, determining plurality of combustion mode (CM) thresholds based on the engine speed and engine temperature, determining an engine load, comparing the engine load and the plurality of CM mode thresholds, and changing a CM of the engine in response to comparing.

In another aspect of the disclosure, a control system for an engine includes control system and method for operating an engine includes a threshold determination module that determines a plurality of CM thresholds based on the engine speed and engine temperature. The control module also includes a transition module that compares the engine load and the plurality of CM thresholds and changes a CM of the engine in response to comparing the engine load and the plurality of CM thresholds.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase "at least one of" A, B, and C should be construed to mean a logical (A or B or C), using a non-exclusive logical OR. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The engine control system according to the present disclosure operates the gasoline engine in the spark ignition (SI) mode and homogenous charge compression ignition (HCCI) mode. The HCCI mode reduces fuel consumption, but is only available over a limited range of engine torques and speeds. For example only, the engine control system may operate the engine in the HCCI mode at low to mid loads and low to mid engine speeds. The engine control system may operate the engine in the SI mode at other loads and engine speeds. The HCCI operating region may be divided into various sub-modes or HCCI operating zones, and may be defined by operating maps in calibration tables.

The engine may be a direct injection gasoline engine and may be selectively operated in a stratified operating mode during the transitions. To operate in the stratified operating mode, the fuel injectors inject a fraction of the total required fuel just before the ignition event. This approach provides a stoichiometric charge near the spark plug, even though the overall environment could be lean causing the air/fuel mixture to ignite easily and burn quickly and smoothly.

Transitions between the HCCI modes should appear seamless to the driver, minimize engine emissions and minimize fuel consumption.

Figure 1A:
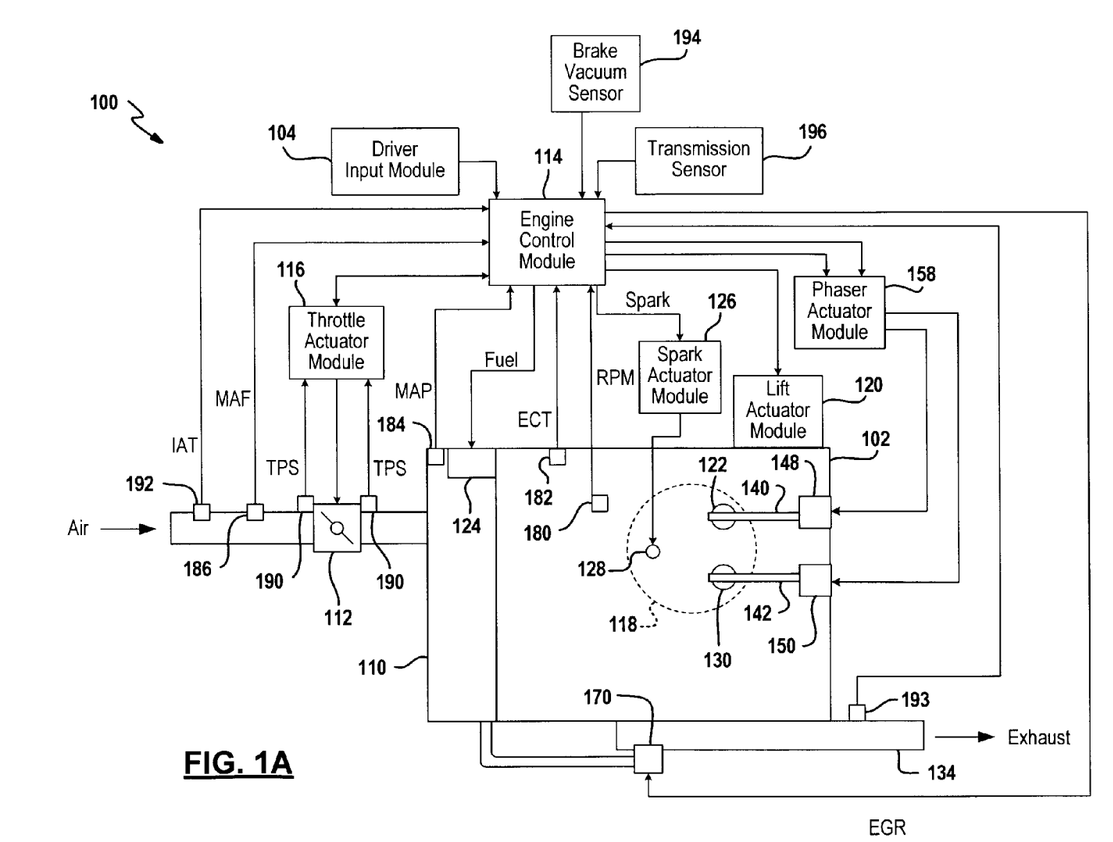
FIG. 1A is a functional block diagram of an engine control system that operates in SI and HCCI combustion modes according to the present disclosure.

Referring now to FIG. 1A, a functional block diagram of an exemplary engine system 100 is presented. The engine system 100 includes an engine 102 that combusts an air/fuel mixture to produce drive torque for a vehicle based on a driver input module 104. The engine may be a direct ignition engine. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as to top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The lift actuator module 120 may switch between high lift and low lift on the exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. Additionally, the lift actuator module controls the amount of lift, which may be adjusted hydraulically or using other methods.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The ECM 114 may calculate measured air per cylinder (APC) based on the MAF signal generated by the MAF sensor 186. The ECM 114 may estimate desired APC based on engine operating conditions, operator input or other parameters.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can, therefore, be referred to as an actuator and the throttle opening area can be referred to as an actuator position.

Similarly, the spark actuator module 126 can be referred to as an actuator, while the corresponding actuator position is the amount of spark advance or retard. Other actuators include the EGR valve 170, the phaser actuator module 158, the fuel injection system 124, and the lift actuator module 120. The term "actuator position" with respect to these actuators may correspond to MAP, EGR valve opening, intake and exhaust cam phaser angles, and air/fuel ratio, respectively.

An engine exhaust temperature sensor 193 generates a signal corresponding to the temperature from the engine. Although one exhaust temperature sensor 193 is illustrated, multiple sensors may be provided. The exhaust temperature sensor may be located at various locations, including before the catalytic converter or after the catalytic converter. The exhaust temperature signal may be communicated to the ECM 114.

A transmission sensor 196 may generate a transmission gear signal or a shift lever position signal and communicate the signal to the ECM 114.

A brake vacuum sensor 194 may generate a brake vacuum sensor signal corresponding to the amount of brake vacuum within the vehicle.

Figure 1B:
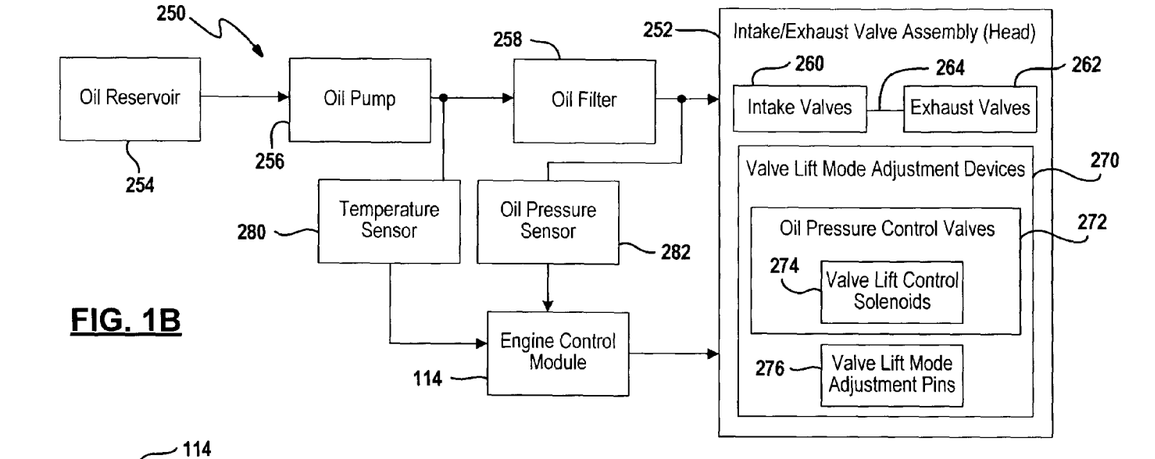
FIG. 1B is a functional block diagram of an exemplary valve lift adjustment system.

Referring now to FIG. 1B, a functional block diagram of a valve lift control circuit 250 is shown. The valve lift control circuit 250 includes an intake/exhaust valve assembly 252 that receives oil from an oil reservoir 254 via an oil pump 256. The oil is filtered through an oil filter 258 prior to reception by the valve assembly 252. The control module controls lift operation of intake and exhaust valves 260, 262 of the valve assembly 252.

The valve assembly 252 includes the intake and exhaust valves 260, 262, which have open and closed states and are actuated via one or more camshafts 264. A dedicated intake camshaft and a dedicated exhaust camshaft may be included. In another embodiment, the intake and exhaust valves 260, 262 share a common camshaft. When in an open state the intake and exhaust valves 260, 262 may be operating in various lift states.

The valve assembly 252 also includes valve lift state adjustment devices 270. The lift state adjustment devices 270 may include oil pressure control valves 272 and valve lift control valves, such as solenoids 274. Other lift state adjustment devices 276, such as lift pins, levers, rockers, springs, locking mechanisms, tappets, etc., may be included.

The valve lift control circuit 250 may include an oil temperature sensor 280 and/or an oil pressure sensor 282. The engine control module 114 signals the oil pressure control valves 272 based on temperature and pressure signals received from the temperature and pressure sensors 280, 282.

Figure 1C:
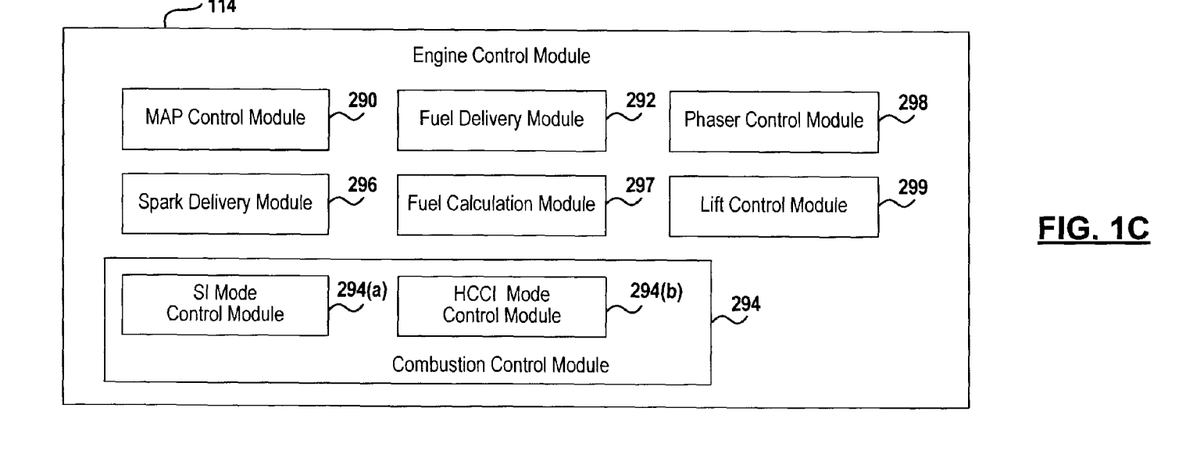
FIG. 1C is a functional block diagram of an exemplary engine control module.

Referring now to FIG. 1C, the ECM 114 may comprise a map control module 290 having a MAP control mode (MM). The MM can be set to SI and HCCI modes. The ECM 114 comprises a fuel delivery module 292 having a fuel delivery mode (FM). The fuel delivery module 292 may switch the FM between SI and various HCCI modes. The fuel delivery module 292 may determine the manner, timing and/or amount of fuel delivery.

The ECM 114 comprises a combustion control module 294 having a combustion mode (CM). The combustion module 294 may switch the CM between SI and various HCCI modes and include an SI control module 294(a) and an HCCI control module 294(b).

The ECM 114 comprises a spark delivery module 296 having a spark delivery mode (SM). The spark delivery module 296 may switch the SM between SI, SI with retard, stratified and HCCI modes. The spark delivery module 296 may determine the timing and duration of spark.

The ECM 114 comprises a fuel calculation module 297 having a fuel calculation mode (FC). The fuel calculation module 297 may switch the FC between air lead and fuel lead modes. In air lead mode, fuel is controlled based on air. In fuel lead mode, air is controlled based on the measured or desired fuel.

The ECM 114 comprises a phaser control module 298 having a phaser control mode (PM). The phaser control module 298 may switch the PM between SI and HCCI modes. The phaser control module 298 may determine cam phasing.

The ECM 114 comprises a lift control module 299 having a lift control mode (LM). The lift control module 299 may switch the LM between high and low valve lift modes.

Figure 1D:
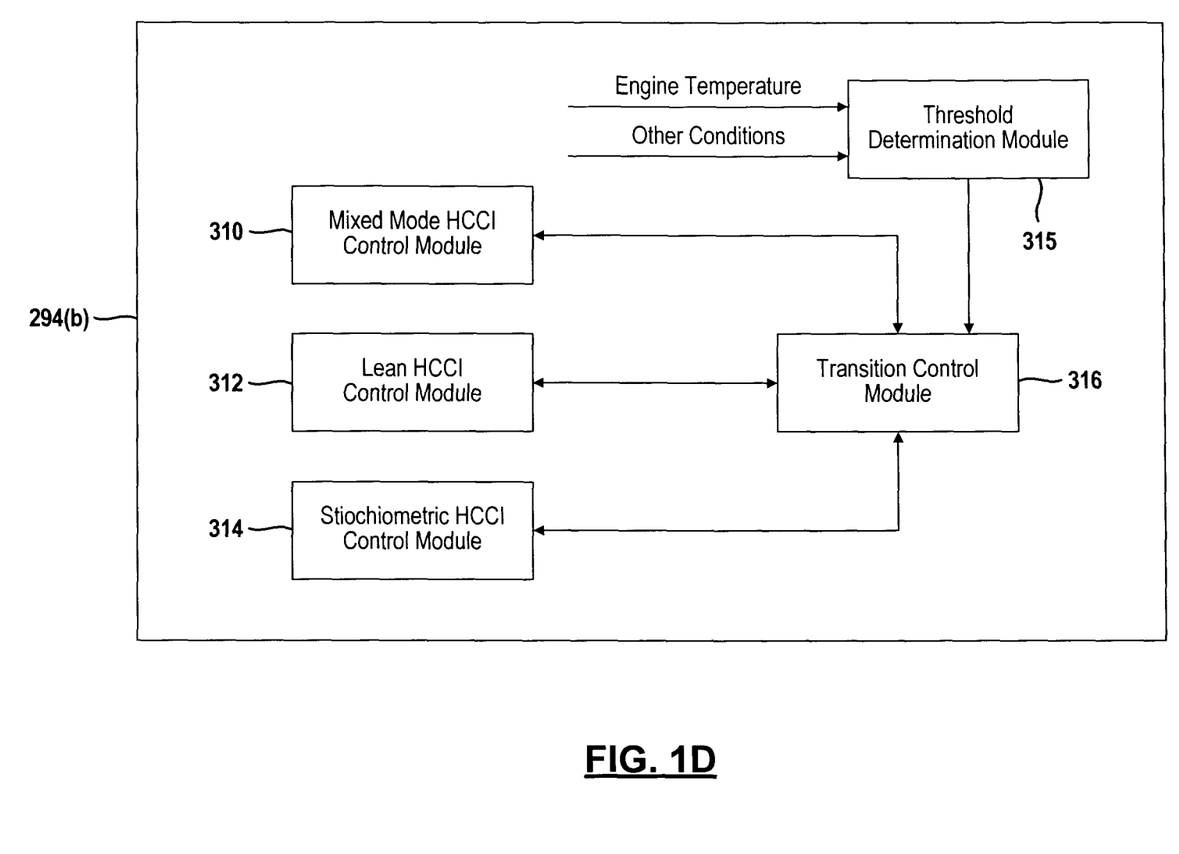
FIG. 1D is a block diagrammatic view of the HCCI mode control module 294(*b*) of FIG. 1C.

Referring now to FIG. 1D, the HCCI mode control module 294(b) is illustrated in further detail. The HCCI mode control module 294(b) controls various modes within the HCCI control range. The HCCI mode control module may include a mixed mode HCCI control module 310, a lean HCCI control module 312 and a stoichiometric HCCI control module 314. While three modes are shown, additional modes are possible. The mixed mode HCCI control module 310 is used to control the HCCI mixed mode, which is used in a low-load operating condition. The low-load operating condition requires substantial fuel reforming, which corresponds to early injection during a recompression cycle. In mixed mode, the exhaust valves are closed early and fuel injections are provided into the closed cylinder to increase the heat contained within the cylinder. The energy from the fuel is converted to increase the temperature within the cylinder. The lean HCCI control module 312 is used to control the lean HCCI mode. In HCCI mode, the exhaust valves are closed early and the fuel is injected with single or multiple injections to provide spontaneous combustion or spark-enhanced combustion.

The stoichiometric HCCI control module 314 controls the air/fuel ratio as the stoichiometric level. Stoichiometric HCCI control is used at higher loads than that of the lean HCCI mode and the mixed mode HCCI control.

A transition control module 316 is in communication with the mixed mode HCCI control module, the lean HCCI module and the stoichiometric HCCI control module. The transition control module 316 controls a transition between the mixed mode and the other modes. A threshold determination module 315 may use various sensor including the engine coolant temperature sensor 182 of FIG. 1A to determine when to enter one of the different CMs.

Figure 2:
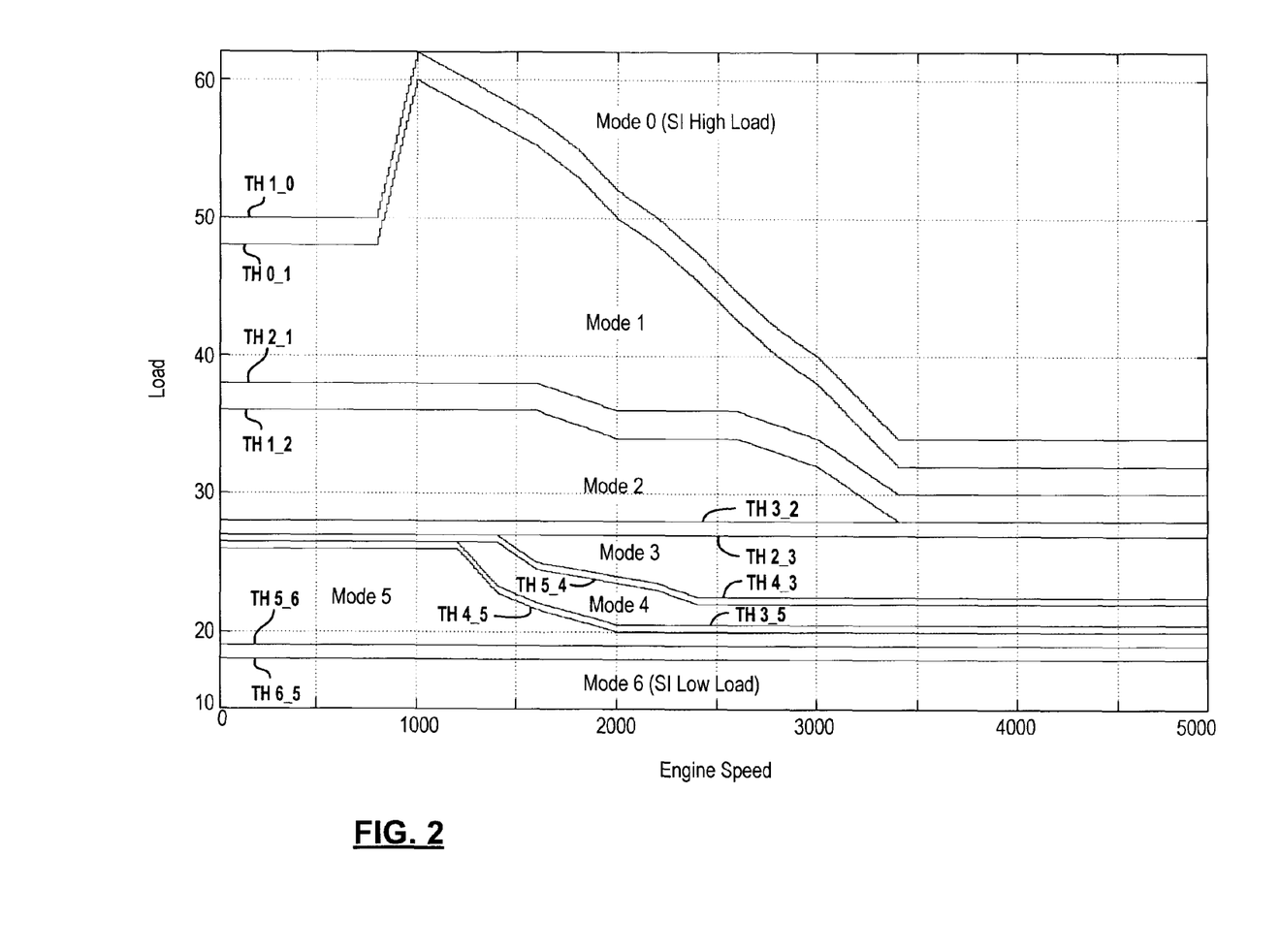
FIG. 2 is a plot of load versus engine speed illustrating various HCCI modes and SI modes.

Referring now to FIG. 2, a plot of various HCCI modes is illustrated. Various modes Mode0-Mode6 are illustrated in a load versus engine speed plot. While 7 modes are shown, the total number of modes could be more or less. The modes start at Mode0 towards the top of the plot at high loads and successively increase mode number as the load decreases. The modes may correspond to different modes, including a spark ignition (SI) mode, such as the Mode0 and Mode6. Various HCCI modes and mixed modes are between the SI modes.

The boundaries from between the various modes are illustrated as thresholds. The thresholds between Mode0 and Mode1 are TH 0-1 and TH 1-0. Threshold TH 0-1 corresponds to a threshold from Mode0 to Mode1 and TH 1-0 to a threshold from Mode1 to Mode0. The area between threshold TH 0-1 and threshold TH 1-0 corresponds to a hysteresis band. If in Mode0, when the load changes below threshold TH 0-1, the mode changes to Mode1 from Mode0. If in Mode1, when the load increases above threshold TH 1-0, the mode returns to Mode0. Likewise, other thresholds and hysteresis thresholds are provided for each of the adjacent load transitions. It should be noted that the boundaries between the different modes change with respect to different engine temperatures. Thus, at another engine temperature, the load lines may be shifted up or down, and may be changed in terms of slope as well. Other engine conditions may be considered in the mode transition boundary determination.

Figure 3:
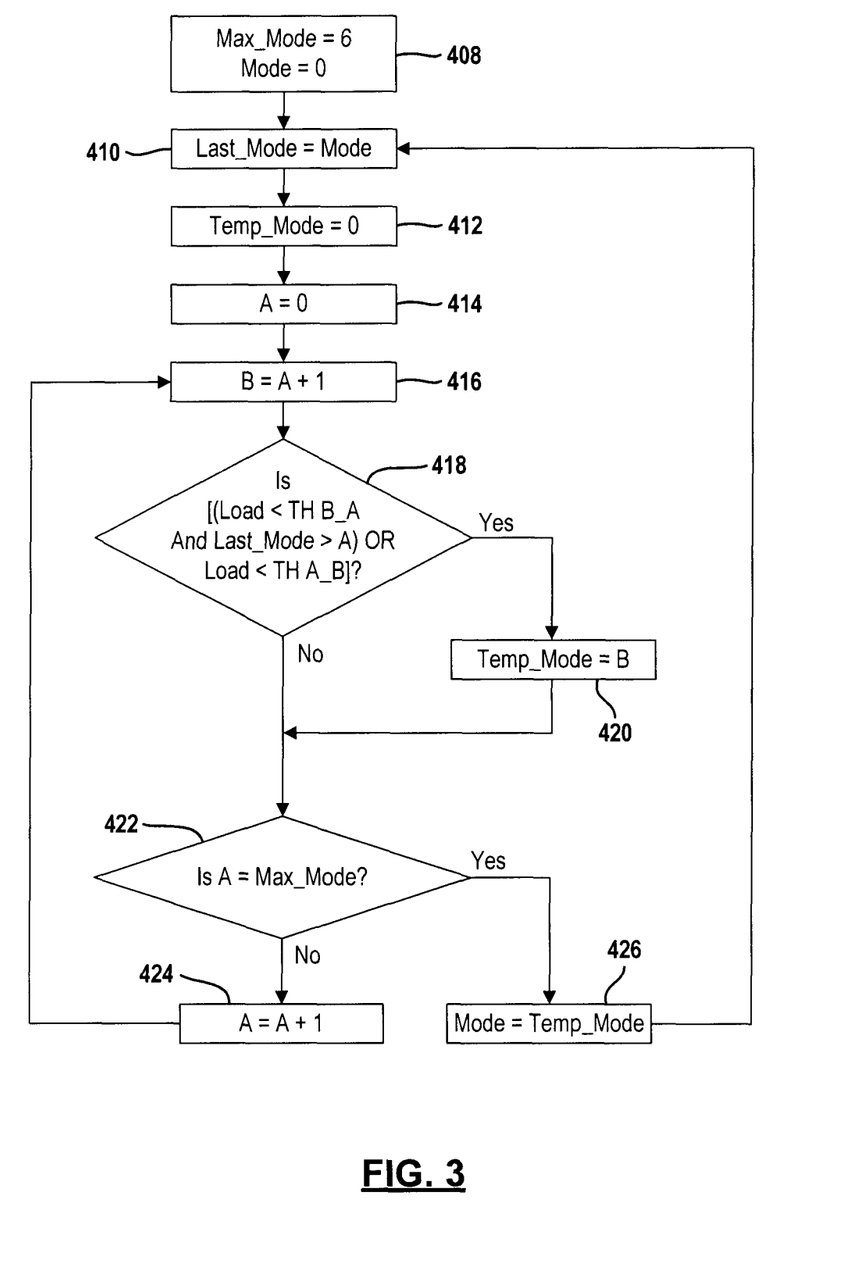
FIG. 3 is a flowchart of a method for operating the system according to the present disclosure.

Referring now to FIG. 3, a method for operating the engine is set forth. The following method starts in Mode0 and, through a series of threshold checks, determines the range based upon the engine load. The thresholds are determined for a pre-determined engine temperature. The engine temperature may be based on the engine coolant temperature (ECT). Mode is represented by an integer number used to signify one of the control modes shown in FIG. 1D.

In step 408, the variable mode is initialized to zero and the variable max_mode is set to a calibrated constant value, shown as 6 in this example. In step 410, the variable last_mode is set to the mode from the previous process. In step 412, the variable temp_mode is initialized to zero. In step 414, variable A is initialized to 0. In step 416, variable B is set to A+1. Variables A and B are used to identify the threshold lines, depicted at TH_A_B or TH B_A.

After step 416, in step 418, if the load is less than TH B_A and the last_mode is greater than A, or the load is less than TH A_B, then temp_mode is set to B in step 420 and then proceeds to perform step 422. If the conditions of step 418 are not met, step 422 is performed.

In step 422 it is determined if A equals the max_mode. When A equals the max_mode, the variable mode is set to temp_mode in step 426 and the process ends. When A does not equal the max_mode, A is incremented in step 424 and step 416 is again performed. Steps 416 thru 424 are repeated as A is incremented, until reaching the max_mode.

After step 426, the process returns back to the beginning step 410 at a predetermined time delay or engine firing event rate.

As can be seen by the above flowchart, the system load will continually change and, thus, the load will be evaluated relative to the various thresholds. As the load changes, the mode will change during engine operation. The load thresholds will also change due to the engine temperature, such as the ECT.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of controlling an engine comprising:
determining a first engine speed;
determining a first engine temperature;
determining a first plurality of combustion mode (CM) threshold curves based on the first engine temperature, wherein each of the first plurality of CM threshold curves is a respective load line having a respective engine load versus engine speed relationship;
determining a first engine load;
based on the first engine speed, comparing the first engine load to each of the first plurality of CM thresholds;
based on the comparisons of the first engine load to each of the first plurality of CM threshold curves, changing a combustion mode of the engine from a first homogeneous charge compression (HCCI) mode to a second HCCI mode;
determining a second engine temperature;
determining a second plurality of CM threshold curves based on the second engine temperature, wherein each of the second plurality of CM threshold curves is a respective load line having a respective engine load versus engine speed relationship;
based on the first engine speed, comparing the first engine load to each of the second plurality of CM threshold curves; and
based on the comparisons of the first engine load to each of the second plurality of CM threshold curves, changing the combustion mode of the engine from the second HCCI mode to the first HCCI mode or to a third HCCI mode.

2. A method as recited in claim 1, wherein the first plurality of CM threshold curves and the second plurality of CM threshold curves are determined based on a transmission gear, a brake vacuum or a barometric pressure.

3. A method as recited in claim 1, wherein the first plurality of CM threshold curves and the second plurality of CM threshold curves are determined based on more than three of the engine temperature, a barometric pressure, a transmission gear, and a brake vacuum.

4. A method as recited claim 1, further comprising changing the combustion mode from the second HCCI mode to the first HCCI mode if the first engine load is greater than a first threshold curve for the first engine speed, wherein:
the first plurality of CM threshold curves comprise the first threshold curve and a second threshold curve;
values of the first threshold curve are greater than corresponding values of the second threshold curve; and
the changing of the combustion mode from the first HCCI mode to the second HCCI mode is performed if the first engine load is less than the second threshold curve for the first engine speed.

5. A method as recited in claim 1, further comprising:
determining a second engine load after the determining of the first engine load;
comparing the second engine load to each of the plurality of CM threshold curves, wherein the first plurality of CM threshold curves comprise a first threshold curve and a second threshold curve, and wherein values of the first threshold curve are greater than corresponding values of the second threshold curve; and
while in the second HCCI mode and if, for the first engine speed, (i) the second engine load is greater than the first threshold curve and (ii) the first engine load is less than the first threshold curve or the second threshold curve, changing the combustion mode from the second HCCI mode to the first HCCI mode,
wherein the changing of the combustion mode from the second HCCI mode to the first HCCI mode is not performed if the second engine load is less than the first threshold curve for the first engine speed.

6. A method as recited in claim 5, wherein the changing of the combustion mode from the first HCCI mode to the second HCCI mode is performed when the first engine load is less than the second threshold curve for the first engine speed and is not performed when the first engine load is greater than the second threshold curve for the first engine speed.

7. A method as recited in claim 6, further comprising:
while in the first HCCI mode, determining a third engine load prior to the determining of the first engine load;
comparing the third engine load to the first plurality of CM threshold curves; and
remaining in the first HCCI mode if, for the first engine speed, the third engine load is greater than the first threshold curve or the second threshold curve.

8. A method as recited in claim 1, further comprising:
determining a second engine load subsequent to the determining of the first engine load;
based on the first engine speed, comparing the second engine load to each of the second plurality of CM threshold curves, wherein load values of each of the second plurality of CM threshold curves is less than corresponding load values of each of the first plurality of CM threshold curves; and
transitioning from the second HCCI mode to the third HCCI mode based on the comparisons of the second engine load to each of the second plurality of CM threshold curves.

9. The method of claim 1, wherein:
the first plurality of CM threshold curves have first respective slopes; and
the second plurality of CM threshold curves have second respective slopes.

10. The method of claim 1, further comprising:
determining a second engine speed;
determining a second engine load;
based on the second engine speed, comparing the second engine load to each of the second plurality of CM threshold curves; and
based on the comparisons of the second engine load to each of the second plurality of CM threshold curves, changing the combustion mode of the engine (i) from the first HCCI mode to the second HCCI mode, or (ii) from the third HCCI mode to the second HCCI mode or a fourth HCCI mode.

11. The method of claim 1, wherein the second plurality of CM threshold curves are shifted up or down from the first plurality of CM threshold curves.

12. The method of claim 1, further comprising, for each of a plurality of temperatures, transitioning between a plurality of HCCI modes based on a plurality of engine loads, wherein:
the plurality of HCCI modes, for the first temperature, include the first HCCI mode and the second HCCI mode;
the plurality of HCCI modes, for the second temperature, includes the first HCCI mode or the third HCCI mode;
the plurality of HCCI modes, for each of the plurality of temperatures, includes a lean HCCI mode, a mixed HCCI mode, and a stoichiometric HCCI mode;
the mixed HCCI mode includes performing fuel injection during a beginning portion of a recompression cycle of the engine; and
an amount of load on the engine is less during the mixed HCCI mode than during the stoichiometric HCCI mode.

13. The method of claim 1, wherein, for the first engine speed, the comparing of the first engine load to each of the first plurality of CM threshold curves or the comparing of the first engine load to the second plurality of CM threshold curves comprises:
setting a first mode value equal to a maximum number of HCCI modes;

setting a previous mode value equal to a current mode value, wherein the previous mode value identifies a previous HCCI mode, and wherein the current mode value identifies a current HCCI mode;

setting a second mode value and a first predetermined value equal to a same initial value;

setting a second predetermined value to be equal to the first predetermined value plus one;

determining, for the first engine speed, (i) whether the first engine load is less than a second CM threshold curve, or (ii) whether the first engine load is greater than a first CM threshold curve and the previous mode is greater than the first predetermined value; and if (i) the first engine load is less than the second CM threshold curve, or (ii) the first engine load is greater than the first CM threshold curve and the previous mode is greater than the first predetermined value, setting the second mode value equal to the second predetermined value.

14. The method of claim 13, wherein, for the first engine speed, the comparing of the first engine load to each of the first plurality of CM threshold curves or the comparing of the first engine load to the second plurality of CM threshold curves comprises:

if (i) the first engine load is greater than or equal to the second CM threshold curve, or (ii) the first engine load is less than or equal to the first CM threshold curve and the previous mode is less than or equal to the first predetermined value, determining whether the first predetermined value is equal to the first mode value;

if the first predetermined value is equal to the first mode value, setting the current mode value equal to the second mode value; and if the first predetermined value is not equal to the first mode value, incrementing the first predetermined value.

15. A control system for an engine comprising:

a threshold determination module that determines a first plurality of combustion mode (CM) threshold curves based on a first engine speed and a first engine temperature, wherein each of the first plurality of CM threshold curves is a respective load line having a respective engine load versus engine speed relationship; and a transition module that compares a first engine load to each of the first plurality of CM threshold curves based on the first engine speed and changes a combustion mode of the engine from a first homogeneous charge compression (HCCI) mode to a second HCCI mode based on the comparisons of the first engine load to each of the first plurality of CM threshold curves, wherein the threshold determination module determines a second plurality of CM threshold curves based on (i) the first engine speed or a second engine speed, and (ii) a second engine temperature, wherein each of the second plurality of CM threshold curves is a respective load line having a respective engine load versus engine speed relationship, and the transition module based on the first engine speed or the second engine speed, compares the first engine load or a second engine load to each of the second plurality of CM threshold curves, and based on the comparisons of the first engine load or the second engine load to each of the second plurality of CM threshold curves, changes the combustion mode of the engine from the second HCCI mode to the first HCCI mode or to a third HCCI mode.

16. A control system as recited in claim 15, wherein:

the transition module changes the combustion mode from the second HCCI mode to the first HCCI mode if the first engine load is greater than a first threshold curve for the first engine speed;

the first plurality of CM threshold curves comprise the first threshold curve and a second threshold curve;

values of the first threshold curve are greater than corresponding values of the second threshold curve; and the transition module changes the combustion mode from the first HCCI mode to the second HCCI mode if the first engine load is less than the second threshold curve for the first engine speed.

17. A control system as recited in claim 15, further comprising a control module that determines a second engine load after determining the first engine load, wherein:

the transition module compares the second engine load to each of the first plurality of CM threshold curves, wherein the first plurality of CM threshold curves comprise a first threshold curve and a second threshold curve, and wherein values of the first threshold curve are greater than corresponding values of the second threshold curve;

the transition module, while in the second HCCI mode and if, for the first engine speed, (i) the second engine load is greater than the first threshold curve and (ii) the first engine load is less than the first threshold curve or the second threshold curve, changes the combustion mode from the second HCCI mode to the first HCCI mode; and the transition module does not change the combustion mode from the second HCCI mode to the first HCCI mode if the second engine load is less than the first threshold curve for the first engine speed.

18. A control system as recited in claim 17, wherein the transition module changes the combustion mode from the first HCCI mode to the second HCCI mode if the first engine load is less than the second threshold curve for the first engine speed and does not change the HCCI mode from the first HCCI mode to the second HCCI mode if the first engine load is greater than the second threshold curve for the first engine speed.

19. A control system as recited in claim 18, wherein:

while in the first HCCI mode, the control module determines a third engine load prior to the determining of the first engine load; and the transition module compares the third engine load to the first plurality of CM threshold curves, and remains in the first HCCI mode if the third engine load is greater than the first threshold curve or the second threshold curve for the first engine speed.

20. A control system as recited in claim 15, further comprising:

determining a second engine load subsequent to determining the first engine load;

comparing the second engine load to each of a second plurality of CM threshold curves, wherein values of each of the second plurality of CM threshold curves are less than corresponding values of each of the first plurality of CM threshold curves; and transitioning from the second HCCI mode to a third HCCI mode based on the comparisons of the second engine load to each of the second plurality of CM thresholds.

* * * * *